United States Patent

[11] 3,612,885

[72] Inventor Jacques A. Arnaud
 Colts Neck, N.J.
[21] Appl. No. 883,696
[22] Filed Dec. 10, 1969
[45] Patented Oct. 12, 1971
[73] Assignee Bell Telephone Laboratories, Incorporated
 Murray Hill, N.J.

[54] GAUSSIAN LASER BEAM-WAIST RADIUS MEASURING APPARATUS
 9 Claims, 5 Drawing Figs.
[52] U.S. Cl..................................................... 250/217,
 250/233, 356/160
[51] Int. Cl..................................................... G02f 1/28
[50] Field of Search.......................................... 250/233,
 232, 217, 219 S; 356/159, 160, 124, 127, 24, 123, 157

[56] References Cited
 UNITED STATES PATENTS
2,999,436 9/1961 Faulhaber ..................... 250/232 X
3,321,630 5/1967 Durig et al. ..................... 250/209
3,398,665 8/1968 John, Jr. et al. ................. 356/124 X
3,436,655 4/1969 Lundgreen ..................... 250/233 X Primary Examiner—Walter Stolwein
Attorneys—R. J. Guenther and William L. Keefauver ABSTRACT: The beam-waist radius of a Gaussian laser beam is measured electronically. This is accomplished by periodically interrupting the laser beam to generate pulsive signals representative of its total power, differentiating the pulsive signals and then taking the ratio of the peak amplitudes of the pulsive signals and the corresponding differentiated signals. The beam-waist radius is proportional to the product of the differentiator time constant and the ratio of the peak amplitude of the pulsive signals to the peak amplitude of the differentiated signals.

PATENTED OCT 12 1971          3,612,885
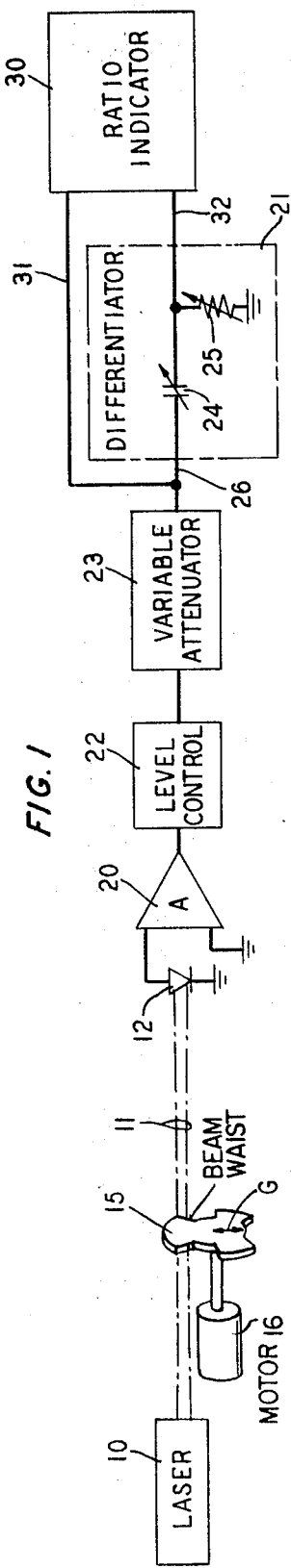
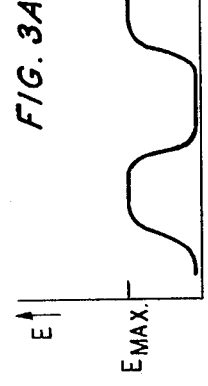
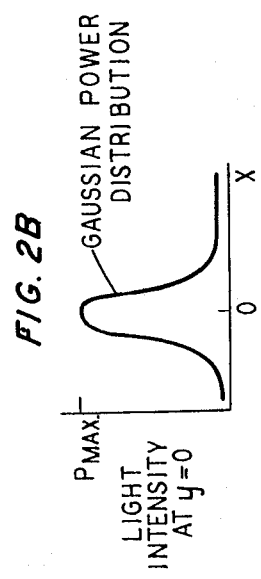
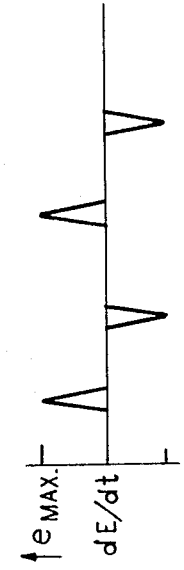
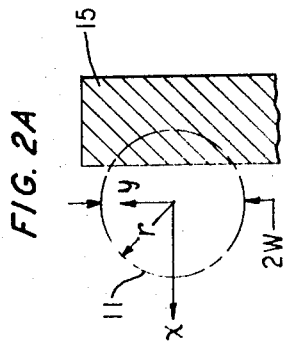
INVENTOR
J. A. ARNAUD
BY
A. E. Huich Jr.
ATTORNEY

GAUSSIAN LASER BEAM-WAIST RADIUS MEASURING APPARATUS

This invention relates to measurement systems and, more particularly, to a system for measuring the beam-waist radius of a Gaussian laser beam.

BACKGROUND OF THE INVENTION

In most laser applications, it is important to know precisely the parameters of the laser beam. Such knowledge is especially vital in applications related to communications systems. For example, it is important that the laser beam parameters be within predetermined limits in order to minimize power losses in a communication system. Additionally, it is important that the parameters be within precise limits in applications involving optical cavities. That is, the laser beam must be precisely matched to the cavity in order to eliminate spurious responses. In most systems the beam parameters require periodic evaluation, in order to insure that they are within predetermined limits.

One of these parameters is commonly known as the "beam-waist," that is, the radius of the beam at its minimum diameter or divergence point. The radius of a Gaussian laser beam if defined as the distance between the maximum power or intensity point of the beam to the point where the beam intensity is reduced by a factor of ($1/exp^2$), which is approximately 0.014. Another important parameter is the position of the beam-waist along the laser beam. Additionally, the laser beam "confocal" parameter may be of interest. Once the beam-waist radius has been measured, however, the confocal parameter may be determined, provided the wavelength of the laser light is known. These parameters, namely, the beam-waist radius and its location describe completely a Gaussian laser beam.

Heretofore, the beam-waist radius and its location, and hence the confocal parameter, were determined by utilizing the so-called "pinhole" technique. In that technique, a surface containing a pinhole is mounted on a micromanipulator and placed in front of a photodetector. A lens of known focal length is positioned along the laser beam for focusing the beam on the photodetector. The radius of the Gaussian beam is then measured by scanning the beam with the pinhole in a given direction to locate the maximum power point, i.e., the center of the beam. That is to say, the surface containing the pinhole and hence the pinhole is moved via the micromanipulator across the laser beam. Once the point of maximum power or intensity is located, the beam is scanned until the point where the beam intensity has decreased by a factor of approximately 0.014 is located. This distance is read off the micromanipulator vernier and is the beam radius.

Use of the pinhole measurement technique is limited to measurements of laser beams having large diameters because the diameter of the pinhole must be very much smaller than the diameter of the laser beam being measured. Otherwise, errors result in the measurement of small diameter laser beams. Moreover, the pinhole measurement technique is slow and tedious because of difficulties in locating the maximum power point via mechanical manipulation.

SUMMARY OF THE INVENTION

These and other problems are resolved in accordance with the inventive principles herein to be described in a laser beam-waist radius measurement system by turning to account the properties of a Gaussian laser beam.

In accordance with the invention, the beam-waist radius, or indeed any radius and hence any diameter along a Gaussian laser beam, is measured electronically. This is accomplished by periodically interrupting the laser beam to obtain pulsive signals representative of the total power of the beam. The pulsive signals are differentiated and a ratio of the peak amplitudes of the pulsive power signals and the corresponding differentiated signals is obtained. In accordance with the invention, the diameter of the Gaussian laser beam is proportional to the product of the differentiator time constant and the ratio of the peak amplitude of the pulsive signals to the peak amplitude of the corresponding differentiated signals.

More specifically, a laser capable of emitting a Gaussian beam is positioned so that its beam is focused upon a photodetector, A chopper plate having predetermined dimensions is positioned at a location along the beam at which the diameter is to be determined. The chopper plate is actuated at a predetermined frequency to interrupt the laser beam periodically. In response to the interrupted laser beam, the photodetector generates pulsive signals representative of the total power of the Gaussian laser beam. The pulsive signals are amplified and supplied to a differentiator network. The differentiator input and output signals are in turn supplied to a ratio indicator where a measure of the ratio between their peak amplitudes is made. In practice, it is preferred, although not required, that the differentiator time constant is adjusted until the peak amplitudes of the differentiator input and output signals are equal. Then, the beam diameter is indicated directly by a measure of the differentiator time constant.

To measure the beam-waist radius, the chopper plate is located along the beam at the position where a maximum output from the differentiator network is obtained. This position is the beam-waist location, i.e., the position of minimum diameter along the laser beam.

The invention will be more fully apprehended from the following detailed description of an illustrative embodiment thereof read in connection with the appended drawings.

BRIEF DESCRIPTION OF THE DRAWING

FIG. 1 depicts in simplified form a measurement system illustrating the invention;

FIG. 2A is a cross-sectional view of a laser beam being scanned by a chopper;

FIG. 2B graphically depicts the power distribution of a Gaussian laser beam;

FIG. 3A shows a waveform useful in describing the operation of the measurement system of FIG. 1; and FIG. 3B depicts a waveform which is the time derivative of the waveform shown in FIG. 3A.

DETAILED DESCRIPTION

FIG. 1 depicts in simplified form a measurement system which illustrates the principles of the invention. Shown is laser 10, which may be any of the numerous ones known in the art capable of generating a beam characterized by a Gaussian power distribution. Laser beam 11 is focused on or otherwise supplied to photodetector 12. Preferably, photodetector 12 is a silicon photocell, having a receptor area which is greater than the cross-sectional area of laser beam 11. Additionally, the photocell utilized for photodetector 12 should have an internal capacitance value which corresponds to the bandwidth requirements of the system. Thus, for measurements of small diameter beams, for example, 0.001 inch or less, the receptor area may have to be reduced in order to prevent band limiting. A lens is then utilized to focus the light onto the detector of reduced area.

Laser beam 11 is periodically interrupted, for example, by chopper 15 to generate pulsating signals. FIG. 2A shows a cross section of laser beam 11 being interrupted in fixed direction $x$ by an edge of chopper 15. FIG. 2B is a graphical illustration of the derivative with respect to direction $x$ of that part of the beam power which is transmitted to photodetector 12 as a function of distance $x$ across the beam. Chopper 15 (FIG. 1) is rotated at a predetermined frequency in a well-known manner by motor 16. Preferably, chopper 15 is a slotted disc having physical dimensions which are determined in accordance with the dimensions of the laser beam to be tested and the angular velocity desired at the beam. It should be noted that the sharpness of the chopper blade edge is critical. For example, irregularities or flutter in the chopper surface result in errors in the diameter measurement because the pulsive signals obtained are not truly representative of the power of the laser beam. Although a slotted disc chopper is utilized in this embodiment of the invention, other devices, for example, tuning forks and the like, may be equally employed to effect periodic chopping of the laser beam.

In response to the interrupted laser beam, photodetector 12 (FIG. 1) generates pulsating signals which are representative of the power of laser beam 11, the pulsating signals are supplied to amplifier 20 and then to differentiator circuit 21 via automatic level control 22 and variable attenuator 23. Differentiator 21 includes variable capacitor 24 and variable resistor 25. Automatic level control 22 and variable attenuator 23 may be any of those known in the art. Since laser power tends to fluctuate, it is desirable to have automatic level control and adjustable amplitude control. However, these functions are not critical and may be eliminated if desired.

FIG. 3A depicts in graphical form pulsating signals, $E(t)$, generated by photodetector 12 which are representative of the power or intensity of laser beam 11. These signals, i.e., $E(t)$, are supplied to differentiator 21 and ratio indicator 30 (FIG. 1) via circuit paths 26 and 31 respectively. The output signals, i.e., $dE/dt$, developed by differentiator 21 are shown in FIG. 3B and are supplied to ratio indicator 30 via circuit path 32. Ratio indicator 30 indicates a measure of the ratio between the peak and amplitudes of the differentiator input and output signals, namely, $E_{max}/(dE/dt)_{max}$. Indicator 30 may include, for example, peak detector networks (not shown) for generating signals proportional to the peak amplitudes of the differentiator input and output signals. The peak detected signals, in turn, may be supplied to a ratio meter, division network, or otherwise utilized to obtain an indication of the desired ratio.

In operation, a laser beam diameter measurement may be made by positioning chopper 15 (FIG. 1) at the "waist" of beam 11. The beam-waist position is located by adjusting the position of chopper 15 until the maximum peak signal output is obtained from differentiator 21 at 32. Chopper 15 is rotated at a predetermined velocity to obtain pulsating signals $E(t)$ which are representative of the power of beam 11, for example, those depicted in FIG. 3A. Pulsating signals $E(t)$ are differentiated (FIG. 3B) and a ratio between the peak amplitudes of the pulsating signals and their corresponding derivative signals is taken, namely $E(t)_{max}/(dE/dt)_{max}$.

In accordance with the invention, the beam-waist radius is proportional to the product of the differentiator time constant and the ratio of the pulsating and differentiated signals for s fixed scanning velocity. This relationship is established by turning to account the Gaussian properties of laser beam 11. Referring again to FIG. 2A, the intensity or power, P, of a Gaussian beam is expressed as $$P(x,y) = Po \exp -2\left(\frac{x^2+y^2}{w^2}\right) \quad (1)$$

where $Po$ is the maximum beam power, and $w$ is the beam-waist radius. It is convenient to assume that the total beam power is unity. Consequently, $Po = 2/\pi w^2$ and equation (1) reduces to $$P(x,y,) = \frac{2}{\pi w^2} \exp -2\left(\frac{x^2+y^2}{w^2}\right) \quad (2)$$

Now, the beam power intercepted by chopper blade 15 at any point $x$ across the beam is expressed as $$P(x) = \frac{2}{\pi w^2} \int_{+\infty}^{x} dx \int_{-\infty}^{+\infty} \exp -2\left(\frac{x^2+y^2}{w^2}\right) dy \quad (3)$$

and the maximum power of laser beam 11 is at its center, i.e., at $x=o$. The maximum rate-of-change of $P(x)$, namely $(dP(x)/dx)_{max}$, is just a vertical slice of the beam width taken at $x=o$ and is expressed as $$\left(\frac{dP(x)}{dx}\right)_{max} = \frac{2}{\pi w^2}\int_{-\infty}^{+\infty} \exp -\frac{2y^2}{w^2} dy \quad (4)$$

Integration of equation (4) results in $$\frac{dP(x)}{dx_{max}} = \sqrt{2/\pi}\,\frac{1}{w} \quad (5)$$

Since the laser beam is being interrupted at a predetermined velocity of $V_c=x/t$, equation (5) may be expressed as $$w = V_c\sqrt{2/\pi}\Big/\left(\frac{dP}{dt}\right)_{max} \quad (6)$$

Initially it was assumed that total beam power was unity to simplify the above theoretical derivation, now including the beam power in equation (6) results in $$w = V_c\sqrt{2/\pi}\,\frac{P_{max}}{(dP/dt)_{max}} \quad (7)$$

where $V_c$ is the chopper velocity at laser beam 11. Since pulsating signals $E(t)$ (FIG. 3A) are representative of power P of laser beam 11, it follows that $E_{max} \alpha Po$ and $(dE/dt)_{max} \alpha (dP/dt)_{max}$. Moreover, the output of differentiator 21 is $dE/dt$ which equals $e/RC$, where $e$ is the potential developed across resistor 25. Therefore, beam-waist radius $x$ may be expressed as $$w = V_c\sqrt{2/\pi}\,RC\frac{E_{max}}{e_{max}} \quad (8)$$

Accordingly, knowing chopper velocity $V_c$ and the differentiator time constant RC, beam-waist $w$ is a measure of the ratio of $E_{max}$, the peak input and $e_{max}$, the peak output signals of differentiator 21. In practice, however, it is preferred that the peak amplitudes of the differentiator input and output signals, $E_{max}$ and $e_{max}$, respectively, be adjusted via variable attenuator 23 and variable resistor 25 until they are equal, then beam-waist $w$ or beam diameter $D(D=2w)$ is a measure of the differentiator time constant.

In practice, it is preferred that the diameter of the laser beam be determined. Since $D=2w$, $$D = 2V_c\sqrt{2/\pi}\,RC\frac{E_{max}}{e_{max}} \quad (9)$$

As noted above, it is desirable to obtain a direct indication of the beam diameter by measuring resistance R of variable resistor 25 (FIG. 1). This is accomplished by choosing values for $V_c$, C and $E_{max}/e_{max}$ which result in the beam diameter being equal to the product of some multiple of 10 and resistance R. Thus, selecting a speed for motor 16 of 3600 r.p.m. and choosing a radius for chopper 15 (G. FIG. 1) of 12/3 inches, the constant $(2V_c\sqrt{2/\pi})$ of equation 9 equals 1,000. Then, by setting the capacitance of capacitor 24 to be 0.01 uf. and adjusting $E_{max}/e_{max}$ to equal one results in $D=10^{15}R$ inches (10) Thus, for a resistance value of 100Ω, the beam diameter is 0.001 inch. The values utilized in this example from practice are merely for purposes of illustration and are not to be construed as limiting the scope of the invention.

What is claimed is:

1. Apparatus for measuring the diameter of a Gaussian laser beam which comprises,
   means for generating first pulsating signals representative of the power of a Gaussian laser beam,
   means responsive to said first pulsating power signals for generating second pulsating signals proportional to the rate-of-change of said first pulsating power signals, and
   means for obtaining a measure of a ratio of the peak amplitudes of said first and second pulsating signals, said measured ratio being a measure of the diameter of said Gaussian laser beam.

2. Apparatus for measuring the diameter of a Gaussian laser beam which comprises,
   means for periodically interrupting a Gaussian laser beam,
   means responsive to said interrupted laser beam for generating first pulsive signals, said first pulsive signals being representative of the power of said laser beam,
   means responsive to said first pulsive signals for generating second pulsive signals proportional to the rate-of-change of the amplitude of said first pulsive signals, and
   means responsive to said first pulsive signals and said rate-of-change signals for obtaining a measure of a ratio of the peak amplitudes of said first pulsive signals and said rateof-change signals, said measured ratio being a measure of the diameter of said laser beam.

3. Apparatus as defined in claim 2 wherein said interrupting means includes a slotted disc chopper and motor means for rotating said chopper at a predetermined angular velocity.

4. Apparatus as defined in claim 2 wherein said first pulsive signal generating means includes a photocell having a receptor area selected in relation to the diameter of the laser beam being measured.

5. Apparatus as defined in claim 2 wherein said rate-of-change signal generating means is a differentiator network.

6. Apparatus as defined in claim 5 wherein said differentiator includes adjustable capacitor means and adjustable resistor means.

7. Apparatus as defined in claim 2 further including means for selectively adjusting the amplitude of said first pulsive signals.

8. Apparatus for measuring the diameter of a laser beam characterized by a Gaussian power distribution which comprises, chopper means for periodically interrupting said laser beam, motor means for rotating said chopper at a preestablished velocity, photocell means responsive to said interrupted laser beam for generating pulsive signals, said pulsive signals being representative of the power of said laser beam, means for selectively controlling the amplitude of said pulsive power signals, differentiator means for generating signals representative of the rate-of-change of the amplitude of said pulsive power signals, said differentiator means including capacitor means and adjustable resistor means, and means responsive to the peak amplitude of said pulsive signals and the peak amplitude of said corresponding differentiated signals for obtaining a measure of a ratio between said peak amplitudes.

9. Apparatus as defined in claim 8 wherein said chopper means includes a slotted disc having predetermined dimensions, said motor means rotates at a predetermined speed and said capacitor means has a predetermined capacitance valve, said chopper dimensions, said motor speed and said capacitance valve being set at preestablished values, so that when the peak amplitude of said pulsive power signals and the peak amplitude of said corresponding differentiated signals are equal, the diameter of said laser beam at the plane at which it is being interrupted by said chopper is directly indicated by a measure of the resistance of said resistor means.